United States Patent [19]

Phillips

[11] 4,097,430

[45] Jun. 27, 1978

[54] AQUEOUS POLYMERIC DISPERSIONS MADE THIXOTROPIC BY CERTAIN AMMONIUM OR POTASSIUM ZIRCONIUM CARBONATES

[75] Inventor: Raymond Francis Phillips, Cincinnati, Ohio

[73] Assignee: Magnesium Elektron Ltd., Swinton, England

[21] Appl. No.: 713,637

[22] Filed: Aug. 12, 1976

Related U.S. Application Data

[63] Continuation of Ser. No. 500,735, Aug. 26, 1974, abandoned, which is a continuation-in-part of Ser. No. 297,415, Oct. 12, 1972, abandoned.

[30] Foreign Application Priority Data

Oct. 22, 1971 United Kingdom ............... 49144/71

[51] Int. Cl.$^2$ ............................................. C08L 1/28
[52] U.S. Cl. .................................... 260/17 R; 260/9; 260/16; 260/17.4 ST
[58] Field of Search .................. 260/17 R, 29.6, 29.7, 260/17.4 ST, 16, 9; 423/420, 593, 419, 421

[56] References Cited

U.S. PATENT DOCUMENTS

| | | | |
|---|---|---|---|
| 2,641,558 | 6/1953 | Urban | 423/420 |
| 3,418,073 | 12/1968 | Blumenthal | 423/420 |
| 3,425,896 | 2/1969 | Hart | 161/266 |
| 3,615,172 | 10/1971 | Fulson | 423/593 |
| 3,741,782 | 6/1973 | Stewart | 260/29.6 |
| 4,061,720 | 12/1977 | Phillips | 423/593 |

FOREIGN PATENT DOCUMENTS

1,029,723   5/1966   United Kingdom ............... 260/29.6

OTHER PUBLICATIONS

Chem. Absts., vol. 65 (1966), 19659d, Pospelova et al., "Carbonate Compounds of Zirconium".

*Primary Examiner*—Edward M. Woodberry
*Attorney, Agent, or Firm*—Karl W. Flocks

[57] ABSTRACT

Aqueous solutions of R zirconium carbonate in which R is selected from ammonium and potassium have a carbonate: zirconia molar ratio not greater than about 2 are used to impart thixotropic properties to aqueous dispersions of polymers and copolymers containing a water-soluble organic colloid containing a hydroxy group, such as emulsion paint. The solutions may be prepared by reacting zirconium basic carbonate with ammonium or potassium carbonate solution and have a good storage stability, especially at high concentrations.

13 Claims, No Drawings

AQUEOUS POLYMERIC DISPERSIONS MADE THIXOTROPIC BY CERTAIN AMMONIUM OR POTASSIUM ZIRCONIUM CARBONATES

BACKGROUND OF THE INVENTION

This application is a continuation of application Ser. No. 500,735, filed Aug. 26, 1974, now withdrawn in favor of the present application, which in turn was a continuation-in-part of application Ser. No. 297,415 filed Oct. 12, 1972 which was withdrawn in favor of Ser. No. 500,735 and Ser. No. 623,992, now U.S. Pat. No. 4,061,720, and relates to the use of the ammonium and potassium zirconium carbonate solutions described therein as thixotropic agents in dispersions of polymers and copolymers, such as paints.

Ammonium zirconium carbonate solutions containing 10% by weight zirconia are commercially available and may be used whenever soluble zirconium in an alkaline environment is required. The solutions are commonly prepared by dissolving, at ambient temperatures, zirconium basic carbonate in a solution containing 3 moles of either commercial ammonium carbonate or a mixture of ammonium bicarbonate and aqueous ammonia. From the method of preparation and the analysis of crystalline materials which have been obtained from these solutions the composition of the principal species present in the solution is believed to be empirically $(NH_4)_3ZrOH(CO_3)_3$ which crystallises as a dihydrate.

Such ammonium zirconium carbonate solutions are extensively used for insolubilising the starch binders used in paper coating formulations. However, their use as starch insolubilisers and for other purposes is restricted because the solutions hydrolyse irreversibly at temperatures above 40° to produce zirconia gels. Further, because the solutions are dilute, the major part of their cost of transportation is the cost of transporting water.

As disclosed in patent application Ser. No. 112,036 (assigned to the assignee of the present application) and now withdrawn in favor of Ser. No. 345,839 which is now U.S. Pat. No. 3,810,852, although some zirconium compounds have been found to impart thixotropy to certain dispersions of polymer or copolymers, for example emulsion paints, the commercially available ammonium zirconium carbonate solutions have not been found effective for that purpose.

SUMMARY OF THE INVENTION

It has been found that concentrated ammonium and potassium zirconium carbonate solutions which are capable of imparting thixotropic properties to aqueous dispersions of polymers and copolymers are more resistant to hydrolysis at elevated temperatures than the more dilute solutions which are presently available and can easily be prepared. In these preparations only limited quantities, generally of the order of one instead of three moles, of added carbonate may be used, which is found to be advantageous both economically and in giving solutions which behave as emulsion paint polymer gellants.

It is an object of the present invention to provide aqueous dispersions of polymers and copolymers containing as ingredients thereof a water-soluble organic colloid containing a hydroxy group and an aqueous solution of R zirconium carbonate, where R is selected from ammonium and potassium, the ammonium or potassium zirconium carbonate imparting thixotropic properties to the dispersion.

It is another object of the invention to provide such dispersions using as thixotropic agents solutions which are relatively concentrated and relatively stable on storage.

Other objects will appear from the following disclosure.

Ammonium zirconium carbonate solutions which may be used in the present invention can be obtained which are stable for at least 10 hours at a temperature of 60° C.

As used in this description and the appended claims the term "stable" means having no tendency to gel or to form a solid precipitate from the components dissolved in the solution on storage.

The solution of ammonium zirconium carbonate may be prepared by reacting zirconium basic carbonate with an aqueous solution or slurry of ammonium carbonate containing 1 mole to 1.5 moles of ammonium carbonate per mole of zirconium basic carbonate.

The solution of potassium zirconium carbonate may be prepared by reacting zirconium basic carbonate with an aqueous solution of potassium carbonate containing from 0.8 to 1.3 moles of potassium carbonate per mole of zirconium basic carbonate.

Zirconium basic carbonate usually contains from about 0.45 to about 0.55 moles of carbonate per mole of zirconia, so that the use of ammonium or potassium carbonate in the above-mentioned quantities provides a solution containing up to approximately 2 moles of carbonate per mole of zirconium, i.e. normally from 1.25 (0.8 plus 0.45) to 1.85 (1.3 plus 0.55) moles of zirconium for potassium zirconium carbonate, and normally from 1.45 (1.0 plus 0.45) to 2.05 (1.5 plus 0.55) moles of zirconium for ammonium zirconium carbonate.

In the preparation of the ammonium zirconium carbonate solution it has been found that, as the amount of ammonium carbonate increases above 1.5 moles, the efficiency of the solution in imparting thixotropic properties to aqueous dispersions of polymers is progressively reduced. It is also generally desirable to use the minimum quantity of ammonium carbonate in the interest of economy. However, the stability of the solution obtained deteriorates progressively and the viscosity of the solution increases as the amount of carbonate present is reduced and it has been found that 1.0 moles of ammonium carbonate per mole of zirconium basic carbonate is a practical lower limit.

In the case of the ammonium zirconium carbonate solutions the addition of ammonium carbonate in a relatively large quantity e.g. 2.0 moles per mole of zirconium basic carbonate, makes it necessary to dilute the final solution further and further with water to prevent the gradual separation of crystals of hydrated ammonium zirconyl carbonate at ambient temperature. Such crystals also separate out from concentrated solution when cooled to temperatures near 0° C but this can be avoided by limiting the ammonium carbonate present to a maximum of 1.5 moles per mole of zirconium basic carbonate.

The reaction between zirconium basic carbonate and ammonium carbonate is aided by heating. According to one preferred procedure, a mixture of 30% aqueous ammonia and an equivalent quantity of ammonium bicarbonate is used in the preparation, in preference to the more expensive ammonium carbonate, to form a slurry. The addition of ammonium bicarbonate to 30% aqueous ammonia proceeds endothermically and it is necessary to apply heat to the slurry to bring its temperature back to room temperature. Zirconium basic carbonate is added gradually to the slurry in such quantities that the viscosity of the slurry permits adequate agitation to be maintained and the temperature of the slurry is raised by the use of live steam or indirect heat. As the reaction proceeds the visosity of the slurry drops and the slurry becomes clearer enabling more zirconium basic carbonate to be added. The temperature of the solution is finally raised to a temperature not exceeding 65° C., and the solution held at that temperature for a sufficient time to permit completion of the reaction.

It is to be noted that following the above procedure, the temperature is gradually raised to a temperature not exceeding 65° C during the addition of zirconium basic carbonate. To raise the temperature of the slurry before any addition of zirconium basic carbonate had been made would lead to loss of ammonia from the reaction medium when the reaction is carried out in an open vessel.

In the preparation of potassium zirconium carbonate solutions for use in polymer and copolymer dispersions according to the present invention, it has been found that a satisfactory solution can be obtained using 0.8 moles of potassium carbonate per mole of zirconium basic carbonate to provide from about 1.25 to 1.35 moles of carbonate per mole of zirconium: if less than 0.8 moles of potassium carbonate is used, the viscosity of the solution obtained increases as the amount of potassium carbonate decreases.

With potassium zirconium carbonate solutions containing 22% $ZrO_2$ no crystals separate out even when the temperature of the solution is lowered to 0° C., and consequently there is no technical reason to limit the amount of potassium carbonate added from the point of view of preparing the solution. However, it is economically desirable to use the minimum amount of potassium carbonate and, in addition, the efficiency of potassium zirconium carbonate as an agent to impart thixotropy to aqueous dispersions of polymers and copolymers, that is as a paint gellant, falls off rapidly as the amount of potassium carbonate used in the preparation increases. Therefore, the amount of potassium carbonate used in the preparation of potassium zirconium carbonate is restricted to a maximum of 1.3 moles per mole of $ZrO_2$, so that the total molar ratio of carbonate to zirconia does not exceed about 1.3 plus 0.55, or 1.85.

Potassium carbonate is sufficiently soluble in water to form a 50% by weight solution. This reaction is exothermic and the solution attains a temperature of 50° – 60° C. At this temperature dissolution of zirconium basic carbonate proceeds readily and the temperature is simply maintained by the use of live steam or an external heat source.

Unlike the ammonium zirconium carbonate solution, the potassium zirconium carbonate solution of the invention can be evaporated (e.g. by spray or drum drying) to produce the stable solid salt which may subsequently be redissolved in water. It has been found that evaporation of the ammonium zirconium carbonate solution produces a decomposed solid which cannot be redissolved to give a solution according to the invention.

The solution of ammonium or potassium zirconium carbonate obtained preferably has a concentration of up to 25% by weight of zirconium expressed as $ZrO_2$; the use of a concentration close to this upper limit is advantageous as the stability of the solutions tends to fall with increasing dilution, especially with ammonium zirconium carbonate.

The use of a high concentration also gives important economies, particularly in transport costs. In the case of ammonium zirconium carbonate, a concentration of from 18% to 22% by weight, expressed as zirconium dioxide, is preferred.

A wide variety of polymers and copolymers may be used in making the dispersion. They may, for example, be based on vinyl esters or on acrylic and methacrylic acid esters or on styrene, acrylonitrile, ethylene or butadiene or the various copolymers in which these monomers may be combined, with or without other unsaturated materials in minor proportions. Particular combinations are the polyacrylates, polyvinyl acetate and copolymers of vinyl acetate with ethylene, with butyl acrylate and with ethylhexyl acrylate. Other polymers and copolymers are those based on vinylidene chlorides and water-soluble alkyd resins (i.e. esters derived from dibasic acids or anhydrides such as phthalic anhydride or succinic acid and polyhydric alcohols such as glycerol, ethylene glycol or pentaerythritol). The polymer or copolymer is generally present in an amount up to about 30% by weight of the dispersion.

The water-soluble organic colloid containing a hydroxy-group may be a cellulose ether, such as ethyl hydroxy ethyl cellulose, hydroxy ethyl cellulose, hydroxy propyl methyl cellulose, methyl cellulose, sodium carboxy methyl cellulose, an ammoniacal solution of aluminium carboxy methyl cellulose, and blended cellulose ethers (mixtures of ionic and non-ionic cellulose ethers). It may also be a starch derivative including starch ethers, such as a sodium carboxymethyl starch. Said colloid is preferably used in an amount of about 0.2 to 0.3% by weight of the dispersion.

The quantity of R zirconium carbonate, expressed as solid, is preferably from 0.1 to 2% by weight of the dispersion

DESCRIPTION OF THE PREFERRED EMBODIMENTS

The following examples 1 and 2 are given to illustrate the preparation of zirconium carbonate solutions, as described in patent application No. 297,415, which may be used in thixotropic dispersions according to this invention.

EXAMPLE 1

This example relates to the preparation of an ammonium zirconium carbonate solution containing a minimum of 20% by weight of $ZrO_2$ and 1.3 moles of ammonium carbonate per mole of $ZrO_2$. 10.3 kg (130 moles) of solid ammonium bicarbonate, $NH_4HCO_3$, were slowly added with stirring to a mixture of 7.4 liters of 30% aqueous ammonia (130 moles) and 8 liters of water to form a thick slurry of ammonium carbonate. As this reaction is endothermic, heat was supplied to bring the temperature of the slurry back to ambient. Still stirring and heating the slurry, 15 kg (50 moles) of zirconium basic carbonate containing 42% by weight of $ZrO_2$ was added. The stirring and heating was continued until the zirconium basic carbonate had dissolved and then a further 15 kg (50 moles) of zirconium basic carbonate was added at a rate at which the viscosity of slurry was such that the latter could easily be stirred. The temperature of the slurry was allowed to rise to 60° C, when the supply of heat was discontinued, and stirring was continued for a further hour for the reaction to be completed. A small quantity of a filter aid was added to the reaction medium which was then filtered under pressure.

The resulting clear solution was found to contain 22% by weight of $ZrO_2$ and was diluted with water to lower the $ZrO_2$ to 20% by weight. Heating the 20% solution at 60° C for at least four hours did not result in the formation of any hydrated gels and storage in a refrigerator at 0° C for 4 weeks did not cause the separation of any crystalline material. Attempts to isolate from the solution by spray drying at a low temperature a solid which would redissolve to form a stable solution were not successful.

EXAMPLE 2

This example describes the preparation of a solution of potassium zirconium carbonate containing 21% by weight of $ZrO_2$ and 1.0 moles, of potassium carbonate per mole of zirconium from which solution a solid containing about 40% of $ZrO_2$ may be separated by removal of the water.

1.38 kg (10 moles) of potassium carbonate was dissolved in 1.40 liters of water and the well-stirred solution heated to 55° C while still stirring. 3 kg (10 moles) of zirconium basic carbonate containing 42% $ZrO_2$ was added to the solution, which was maintained at a temperature ranging from 55° – 60° C. At the end of the addition, the solution was maintained at from 55° – 60° C with continuous stirring for a further hour to complete the reaction. The resulting solution was filtered under suction.

The final clear solution was found to contain 21% by weight of $ZrO_2$ and to be sufficiently stable to heat to permit the isolation of a solid potassium zirconium carbonate which would redissolve to form a stable solution by spray drying or, preferably by drum drying at as low a temperature as possible consistent with obtaining a free-flowing product.

EXAMPLE 3

This example illustrates the thixotropic dispersions suitable for use as paints which may be obtained using the compositions prepared according to Examples 1 and 2 above.

A basic paint composition was prepared having the following ingredients:

| | |
|---|---|
| Titanium dioxide | 440 g |
| China Clay SP3 | 220 g |
| Calgon (a sodium hexametaphosphate) | 4 g |
| 1.5% aqueous solution of Natrosol 250 MR (a hydroxyethyl cellulose) | 240 g |
| Polimul 995 (a vinylacetate/acrylate copolymer latex) | 620 g |
| Water | 450 g |
| Dilute ammonia solution (50% 0.88 $NH_3$, 50% $H_2O$) | 15 g |
| Ethylene glycol monobutyl ether acetate (butyl cellosolve acetate) | 20 g |
| Proxel AB (a non-mercurial preservative) | 1 g |

The Calgon was dissolved in the water with stirring and the Natrosol solution was added, followed by stirring for 10 minutes. The butyl cellosolve acetate, Proxel, clay and $TiO_2$ were then successively added followed by rapid stirring for 15 minutes. The Polimul was then added and stirring continued for 10 minutes at a reduced speed. Finally the ammonia solution was added and stirring continued for another 15 minutes.

Three 300 g batches of the basic paint were weighed out and amounts of the zirconium carbonate solutions prepared as in Examples 1 and 2 to give 3 g of the ammonium or potassium zirconium carbonate per sample were immediately added, to respective samples, the third sample being used as a control containing no zirconium carbonate. The samples were then stirred for 5 minutes and stored in sealed tins. The gel strengths were measured after 24 hours storage (initial strength) and after 48 hours storage (regain strength) using an ICI Gel Strength Tester which is a standard instrument for measuring shear strengths of gels; the results are quoted herein in g per cm.

The results obtained are shown in Table 1.

TABLE 1

| | | Gel Strength | |
|---|---|---|---|
| | Gellant added | Initial g/cm | Regain g/cm |
| Sample 1 | Complex Ammonium Zirconium Carbonate | 142 | 108 |
| Sample 2 | Complex Potassium Zirconium Carbonate | 232 | 157 |
| Sample 3 | None | 10 | 5 |

It can be seen from the above results that the ammonium and potassium zirconium carbonate solutions used in this invention gave a high degree of thixotropy to the dispersion of polymers suitable for use as a paint.

EXAMPLE 4

This example illustrates the improvement in thixotropic properties obtained using the potassium zirconium carbonate of this invention compared with other known thixotropic agents.

A standard white emulsion paint was made using the following ingredients:

TABLE 2

| Trade name | Material | | |
|---|---|---|---|
| Kronos RA 44 | Rutile | 240.0 | parts by wt. |
| Speswhite | China Clay | 120.0 | " |
| 2% Natrosol 250 MR | Hydroxyethyl cellulose | 100.0 | " |
| D.M.Co-polymer emulsion | Vinyl acetate/2-ethyl-hexyl acrylate co-polymer | 327.0 | " |
| Calgon PT (a complex phosphate) | Dispersing agent | 1.0 | " |
| Nopco NDW | Surface active agent | 0.5 | " |
| Dowicil 100 | Preservative | 1.5 | " |
| Aqueous Ammonia | 1 : 1 0.88 $NH_3$ and water | 5.0 | " |
| Water | | 205.0 | " |
| | | 1,000.0 | |
| Pigment volume concentration (PVC) | 40% | | |
| Total Solids | 55% | | |
| Pigment Binder Ratio | 2 : 1 | | |

The pH of the paint was adjusted to 9 by adding aqueous ammonia.

Samples of 300 parts by weight of the paint were taken and different gelling agents, each diluted with water to a total of 20 parts by weight, were added with stirring.

The gellants used are identified below as follows:

| | |
|---|---|
| KZC | Potassium zirconium carbonate (solid) obtained by process of Example 2 |
| TET | Triethanolamine titanate |
| Zircomplex PN | A composition containing zirconium chelated with lactic acid |

The gel strengths were measured after 24 hours storage in sealed tins, using an ICI Gel Strength Tester. The paint was then thinned by shearing and the gel strength measured after a further 24 hours ("regain gel strength").

The results obtained were as shown in Table 3:

TABLE 3

| Gellant | % added | Initial gel 24-hrs g/cm | Regain gel 24-hrs g/cm | % Regain |
|---|---|---|---|---|
| KZC (Solid) | 1.0 | 415 | 302 | 73 |
| TET | 1.0 | 240 | 160 | 68 |
| Zircomplex PN | 1.0 | 215 | 160 | 74 |

This procedure was repeated but with smaller quantities of added gelling agent. The results are shown in Table 3:

TABLE 4

| Gellant | % added | Initial gel 30-hrs g/cm | Regain gel 24-hrs g/cm | % Regain |
|---|---|---|---|---|
| KZC (Solid) | 0.4 | 203 | 152 | 75 |
| KZC (Solid) | 0.6 | 262 | 220 | 84 |
| TET | 0.6 | 152 | 108 | 71 |
| Zircomplex PN | 0.6 | 135 | 98 | 73 |

It can be seen from the above results that the potassium zirconium carbonate of this invention gives results which are superior as regards thixotropic properties to those obtained using other, known thixotropic agents.

I claim:

1. A method of making a thixotropic aqueous dispersion of a polymer or copolymer selected from the group consisting of alkyd resins and products obtained by polymerisation of at least one of vinyl esters, acrylic esters, methacrylic esters, styrene, acrylonitrile, ethylene and vinylidine chloride which comprises mixing with a dispersion of said polymer or copolymer
   (1) an amount sufficient of an aqueous solution of ammonium zirconium carbonate to impart thixotropic properties to said dispersion, said solution containing 18-25% by weight of zirconium expressed as zirconium dioxide and having a molar ratio of carbonate to zirconium not greater than 2.05; and
   (2) a water-soluble organic colloid containing an hydroxyl group.

2. A method as claimed in claim 1, which comprises mixing with a dispersion of said polymer or copolymer an aqueous solution of ammonium zirconium carbonate containing from 18 to 22% by weight of zirconium expressed as zirconium dioxide.

3. A method as claimed in claim 1, in which said solution of ammonium zirconium carbonate is prepared by reacting zirconium basic carbonate with an aqueous solution or slurry of ammonium carbonate containing from 1.0 to 1.5 moles of ammonium carbonate per mole of zirconium basic carbonate.

4. A method as claimed in claim 1, in which the quantity of ammonium zirconium carbonate, expressed as a solid, is from 0.1 to 2% by weight of the dispersion.

5. A method as claimed in claim 1, in which the dispersion of said polymer or copolymer is mixed with a water soluble organic colloid selected from the group consisting of cellulose ethers and starch derivatives.

6. A method as claimed in claim 1, in which the dispersion of said polymer or copolymer, said aqueous solution of ammonium zirconium carbonate and said water soluble organic colloid are mixed to give a thixotropic aqueous dispersion containing up to 30% by weight of said polymer or copolymer.

7. A method as claimed in claim 1, in which said water soluble organic colloid is mixed with said dispersion of said polymer or copolymer to give a thixotropic aqueous dispersion containing from about 0.2 to 0.3% by weight of said colloid.

8. A method of making a thixotropic aqueous dispersion of a polymer or copolymer selected from the group consisting of alkyd resins and products obtained by polymerisation of at least one of vinyl esters, acrylic esters, methacrylic esters, styrene, acrylonitrile, ethylene and vinylidine chloride which comprises mixing with a dispersion of said polymer or copolymer
   (1) an amount sufficient to impart thixotropic properties to said dispersion of potassium zirconium carbonate having a molar ratio of carbonate to zirconium not greater than 1.85, and
   (2) a water soluble organic colloid containing an hydroxyl group.

9. A method as claimed in claim 8, in which said solution of potassium zirconium carbonate is prepared by reacting zirconium basic carbonate with an aqueous solution containing from 0.8 to 1.3 mole of potassium carbonate per mole of zirconium basic carbonate.

10. A method as claimed in claim 8, in which the quantity of potassium zirconium carbonate, expressed as a solid, is from 0.1 to 2% by weight of the dispersion.

11. A method as claimed in claim 8, in which the dispersion of said polymer or copolymer is mixed with a water soluble organic colloid selected from the group consisting of cellulose ethers and starch derivatives.

12. A method as claimed in claim 8, in which the dispersion of said polymer or copolymer, said of potassium zirconium carbonate and said water soluble organic colloid are mixed to give a thixotropic aqueous dispersion containing up to 30% by weight of said polymer or copolymer.

13. A method as claimed in claim 8, in which said water soluble organic colloid is mixed with said dispersion of said polymer or copolymer to give a thixotropic aqueous dispersion containing from about 0.2 to 0.3% by weight of said colloid.

* * * * *